United States Patent [19]

Nakano

[11] Patent Number: 5,464,375

[45] Date of Patent: Nov. 7, 1995

[54] FRICTION-ROLLER-TYPE CONTINUOUSLY VARIABLE TRANSMISSION

[75] Inventor: Masaki Nakano, Yokohama, Japan

[73] Assignee: Nissan Motor Co., Ltd., Yokohama, Japan

[21] Appl. No.: 203,242

[22] Filed: Mar. 1, 1994

[30] Foreign Application Priority Data

Mar. 1, 1993 [JP] Japan ................................. 5-064617

[51] Int. Cl.$^6$ .................................................. F16H 15/38
[52] U.S. Cl. ............................ 476/10; 475/214; 476/42
[58] Field of Search ......................... 476/10, 42; 475/214

[56] References Cited

U.S. PATENT DOCUMENTS 5,027,669  7/1991  Nakano ................................. 476/42 X
5,052,236  10/1991  Nakano ................................. 476/10 X

FOREIGN PATENT DOCUMENTS

4-78365  3/1992  Japan .
4-78366  3/1992  Japan .

Primary Examiner—Allan D. Herrmann
Attorney, Agent, or Firm—Lowe, Price, LeBlanc & Becker

[57] ABSTRACT

A continuously variable transmission includes friction rollers which are arranged in a toroidal groove formed between input and output disks and rotatably supported by roller support members. Hydraulic cylinder units for axially driving the roller support members are applied with a hydraulic pressure which is controlled by a forward drive speed ratio control valve in a forward drive mode, and by a reverse drive speed ratio instruction valve in a reverse drive mode. A feedback mechanism includes a precession cam provided for only one of the roller support members, which is associated with two links. These links undergo swing movement in accordance with the rotation of the precession cam, with their one ends maintained in contact with respective cam surfaces. Another ends of the links perform feedback of the speed ratio to the forward drive speed ratio control valve and the reverse drive speed ratio instruction valve, respectively.

2 Claims, 6 Drawing Sheets

*FIG. I* (PRIOR ART)

FIG_2

FIG. 3

FIG_4

FRICTION-ROLLER-TYPE CONTINUOUSLY VARIABLE TRANSMISSION

BACKGROUND OF THE INVENTION

1. Field of the Invention

The present invention relates generally to a friction-roller-type continuously variable transmission for automobiles or the like, and more specifically to a speed ratio control device for such transmissions.

2. Description of the Related Art

A friction-roller-type continuously variable transmission for automobiles or the like is known, e.g., from JP-A-4-78,365 and JP-A-4-78,366. The transmission as known from these patent documents includes friction rollers which are arranged in a toroidal groove formed between input and output disks and rotatably supported by rotatable and axially movable roller support members having respective rotational axes which are perpendicular to the common axis of the input and output disks. The speed ratio of the transmission between the input and output disks is determined in accordance with the axial position of the friction rollers. Thus, hydraulic cylinder units are provided to axially move the roller support members and hence friction rollers relative to the input and output disks. The transmission further includes a forward drive/reverse drive switching mechanism for effecting a switchover between a forward drive mode and a reverse drive mode of the transmission. For controlling the speed ratio of the transmission, there is provided a speed ratio control device which includes a forward drive speed ratio control valve and a reverse drive speed ratio instruction valve. The forward drive speed ratio control valve is operative when the switching mechanism assumes the forward drive position, and serves to control the speed ratio in the forward drive mode. The reverse drive speed ratio instruction valve is operative when the switching mechanism assumes the reverse drive position, and serves to provide a constant speed ratio in the reverse drive mode.

In order to ensure a stabilized maintenance of the instructed speed ratio, the forward drive speed ratio control valve is provided with a precession cam and a link for a performing feedback of the angular displacement of one of the roller support members to the forward drive speed ratio control valve. Also, in order to achieve a predetermined constant reverse drive speed ratio, the reverse drive speed ratio instruction valve is provided with another precession cam and another link for performing a feedback of the angular displacement of the other roller support member to the reverse drive speed ratio instruction valve.

The above-mentioned conventional arrangement of speed ratio control device for the friction-roller-type continuously variable transmissions proved to provide a satisfactory control of the forward drive speed ratio and the reverse drive speed ratio. However, the provision of a set of precession cam and link associated with one roller support member, and another set of precession cam and link associated with another roller support member, often makes it difficult to reduce the number of components and cost of the transmission. While the transmission includes relatively large components, such as solenoid valves, step motors, and the like, these components cannot be arranged within movable ranges of the two precession cams and two links. Such components have to be arranged outside the movable ranges of the cams and the links, so that the transmission as a whole becomes bulky and heavy in weight. Moreover, the limitation in the arrangement of the components makes it often difficult to get an easy access thereto as required for assembly or maintenance of the transmission. As the case may be, the assembly or maintenance of the transmission cannot be performed without removing the entire control valves.

SUMMARY OF THE INVENTION

It is therefore an object of the present invention to provide a friction-roller-type continuously variable transmission including a novel and improved speed ratio control device which is capable of eliminating the above-mentioned drawbacks of the conventional arrangement.

To this end, according to the present invention, there is provided a friction roller type continuously variable transmission comprising:

an input disk and an output disk both having a common axis and contact surfaces which are opposed to each other to define a toroidal groove therebetween;

a plurality of friction rollers arranged in said toroidal groove and maintained in frictional contact with said contact surfaces of the input and output disks;

a plurality of roller support members for rotatably supporting the friction rollers through eccentric shafts, respectively, said roller support members each having a shaft portion with an axis which is perpendicular to said common axis of the input and output disks, said roller support members being rotatable about the axis of the shaft portions and axially movable along the shaft portions;

hydraulic cylinder units for driving the roller support members in the axial directions of said shaft portions;

a forward drive speed ratio control valve for controlling a hydraulic pressure to be supplied to the hydraulic cylinder units during a forward drive mode of the transmission;

a reverse drive speed ratio instruction valve for controlling the hydraulic pressures to be supplied to the hydraulic cylinder units during a reverse drive mode of the transmission; and a feedback mechanism for performing a speed ratio feedback by transmitting an angular displacement of the roller support member to the forward drive speed ratio control valve and the reverse drive speed ratio instruction valve so that a speed ratio between the input disk and the output disk assumes a target value;

said feedback mechanism comprising a precession cam provided for one of the roller support members so as to be rotatable jointly therewith, said precession cam having two cam surfaces which are inclined along the rotating direction of the precession cam;

said feedback mechanism further comprising two links adapted to undergo swing movement in accordance with the rotation of the precession cam and provided with first ends and second ends, respectively, said first ends of the two links being maintained in contact with the respective cam surfaces of the precession cam, said second end of one of said links being capable of performing a feedback of the speed ratio to said forward drive speed ratio control valve, and said second end of the other of said links being capable of performing a feedback of the speed ratio to the reverse drive speed ratio instruction valve, wherein said feedback mechanism further comprises a step motor which is operated in accordance with an instructed speed ratio to actuate said speed ratio control valve for the forward driving mode, said step motor being arranged adjacent to the other of the roller support members which is free from said precession cam.

With the above-mentioned arrangement of the present invention, when the roller support member is rotated, the precession cam rotates jointly with the roller support member. As a result, the two links in contact with the relevant cam surfaces of the precession cam at their respective one ends are caused to swing. In the forward drive mode, the other end of one of the links serves to transmit the angular displacement of the roller support member to the forward drive speed ratio control valve for the forward drive mode. Thus, it is possible to perform the feedback of the speed ratio in the forward drive mode. In the reverse drive mode, the other end of the other link serves to transmit the angular displacement of the roller support member to the reverse drive speed ratio instruction valve for the reverse drive mode. Thus, it is possible to perform the feedback of the speed change gear ratio in the reverse drive mode.

Therefore, the present invention makes it possible to perform the feedback of the speed ratio to the forward drive speed ratio control valve and also to the reverse drive speed ratio instruction valve by using a single precession cam only, hence with an arrangement comprising a reduced number of components.

Moreover, since a single precession cam is provided for one roller support member only, it is possible to arrange relatively large components, such as step motors, solenoid valves and the like, at locations around one of the roller support members which is free from the precession cam. This serves to readily realize a compact arrangement which is light in weight. These large components can be accessed from one side, e.g., the oil pan side of the control valve body, thereby facilitating the assembly and maintenance of the transmission.

BRIEF DESCRIPTION OF THE DRAWINGS

The present invention will now be explained in further detail by referring to one preferred embodiment shown in the accompanying drawings, in which.

DESCRIPTION OF THE PREFERRED EMBODIMENT

Figure 1:
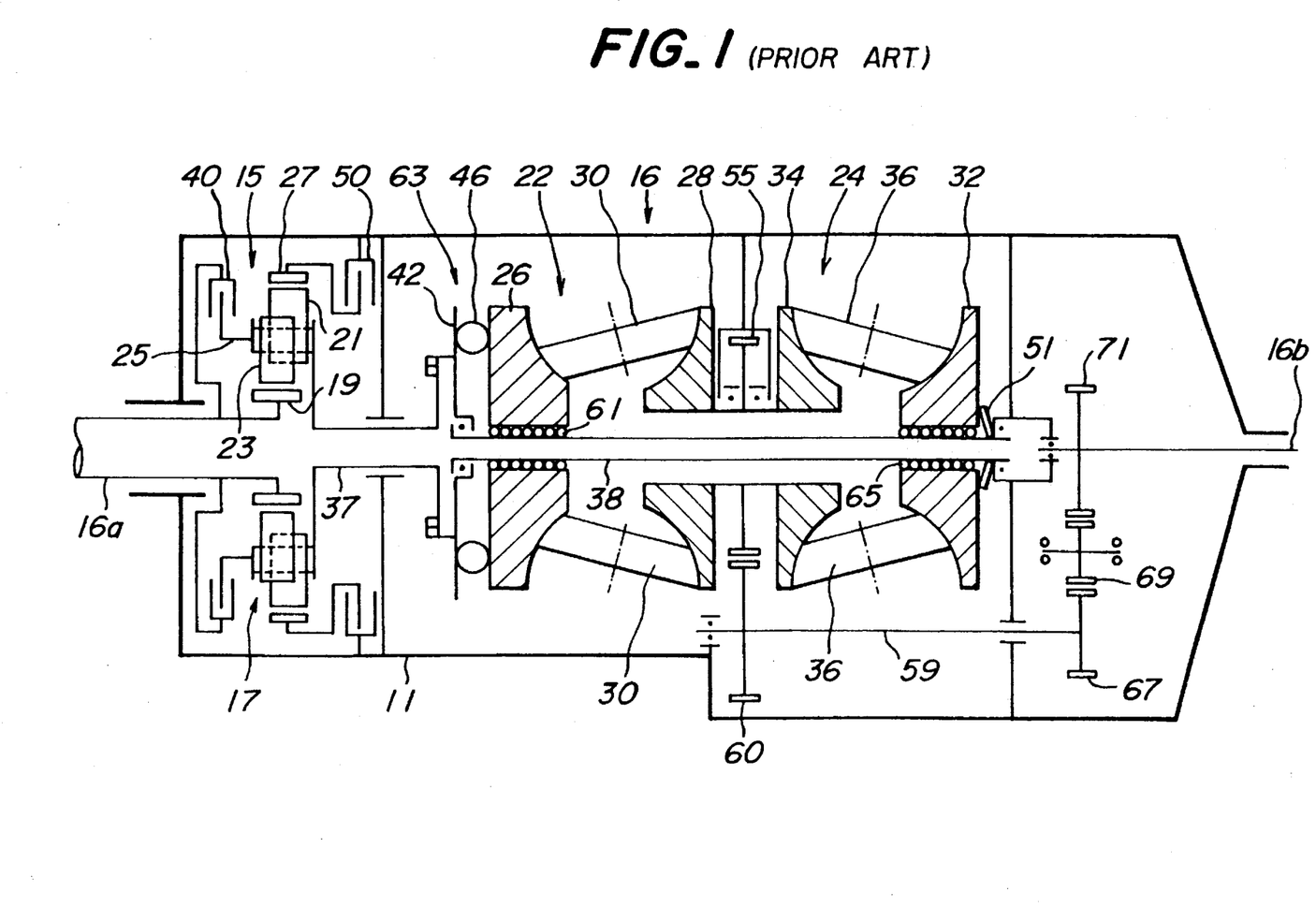
FIG. 1 is a skeleton diagram of the friction-roller-type continuously variable transmission.

Referring now to FIG. 1, there is shown a skeleton diagram of a friction-roller-type continuously variable transmission 16 to which the present invention may be applied. The transmission 16 includes a casing 11 and an input shaft 16a which extends into the casing 11. The input shaft 16a is connected to a forward drive/reverse drive switching mechanism 15 for effecting a switchover between the forward drive mode and the reverse drive mode of the transmission. The switching mechanism 15 includes a planetary gear mechanism 17, a clutch 40 for the forward drive mode, and a brake 50 for the reverse drive mode. The planetary gear mechanism 17 is comprised of a sun gear 19, two pinions 21 and 23 both carried by a pinion carrier 25, as well as an internal gear 27. The pinions 21 and 23 are made to have the same diameter, and are in mesh with each other. Moreover, the pinions 21 and 23 are in mesh with the internal gear 27 and the sun gear 19, respectively. The sun gear 19 is connected to the input shaft 16a so as to be rotatable jointly with the input shaft 16a at any time. The pinion carrier 25 can be connected to the input shaft 16a by means of the clutch 40 for the forward driving mode. Moreover, the internal gear 27 can be fixed to the casing 11 by means of the brake 50 for the reverse driving mode. The pinion carrier 25 is connected to a transmission shaft 37 which, in turn, is connected to a first speed ratio control mechanism 22 and a second speed ratio control mechanism 24 to be fully explained hereinafter.

The first speed ratio control mechanism 22 and the second speed ratio control mechanism 24 are provided in the casing 11, on the downstream side of the switching mechanism 15. The first speed ratio control mechanism 22 includes an input disk 26, an output disk 28 and a pair of friction rollers 30 for transmitting torque between the two disks. The input disk 26 and the output disk 28 have contact surfaces which are formed into toroidal surfaces and engaged by the friction rollers 30. By changing the contact states of the friction rollers 30 relative to the input disk 26 and the output disk 28, it is possible to continuously change the rotational speed ratio between the input disk 26 and the output disk 28.

The second speed ratio control mechanism 24 also includes an input disk 32, an output disk 34 and a pair of friction rollers 36, which are constituted in the same manner as the first speed ratio control mechanism 22. However, the arrangement of the input disk 32 and the output disk 34 of the second speed ratio control mechanism 24 is opposite to that of the first speed ratio control mechanism 22. Thus, the arrangement is such that the output disk 28 of the first speed ratio control mechanism 22 and the output disk 34 of the second speed ratio control mechanism 24 are arranged adjacent to each other.

The input disk 26 of the first speed ratio control mechanism is supported on the outer periphery of an input shaft 38 through a ball spline 61 such that the input disk is rotatable jointly with the transmission shaft 37. A cam flange 42 is arranged at the back surface side of the input disk 26, i.e. that side of the input disk 26 which is remote from the output disk 28. A cam roller 46 is provided between opposite cam surfaces of the cam flange 42 and the input disk 26. The cam roller 46 is formed into such a shape that it generates a force which urges the input disk 26 toward the output disk 28 upon occurrence of a relative rotation between the input disk 26 and the cam flange 42. A loading cam assembly 63 is constituted by the cam flange 42, the input disk 26 and the cam roller 46.

Similarly, the input disk 32 of the second speed ratio control mechanism 24 is connected to the input shaft 38 through a ball spline 65. The input disk 32 is always applied with an axial force by a belleville spring 51, which urges the input disk 32 toward the output disk 34. The output disk 28 of the first speed ratio control mechanism 22 and the output disk 34 of the second speed ratio control mechanism 24 are rotatably supported on the input shaft 38, respectively.

There is provided a driving gear 55 which is rotatable jointly with the output disk 28 and the output disk 34. The driving gear 55 is meshed with a driven gear 60 which is arranged at one end of an intermediate shaft 59 extending in parallel with the input shaft 38, such that the driven gear 60 is rotatable jointly with the intermediate shaft 59. A gear 67 is formed on the other end of the intermediate shaft 59 integrally therewith. This gear 67 is connected, through an idler gear 69, to a gear 71 which is formed integrally with an output shaft 16*b* of the transmission 16.

Figure 2:
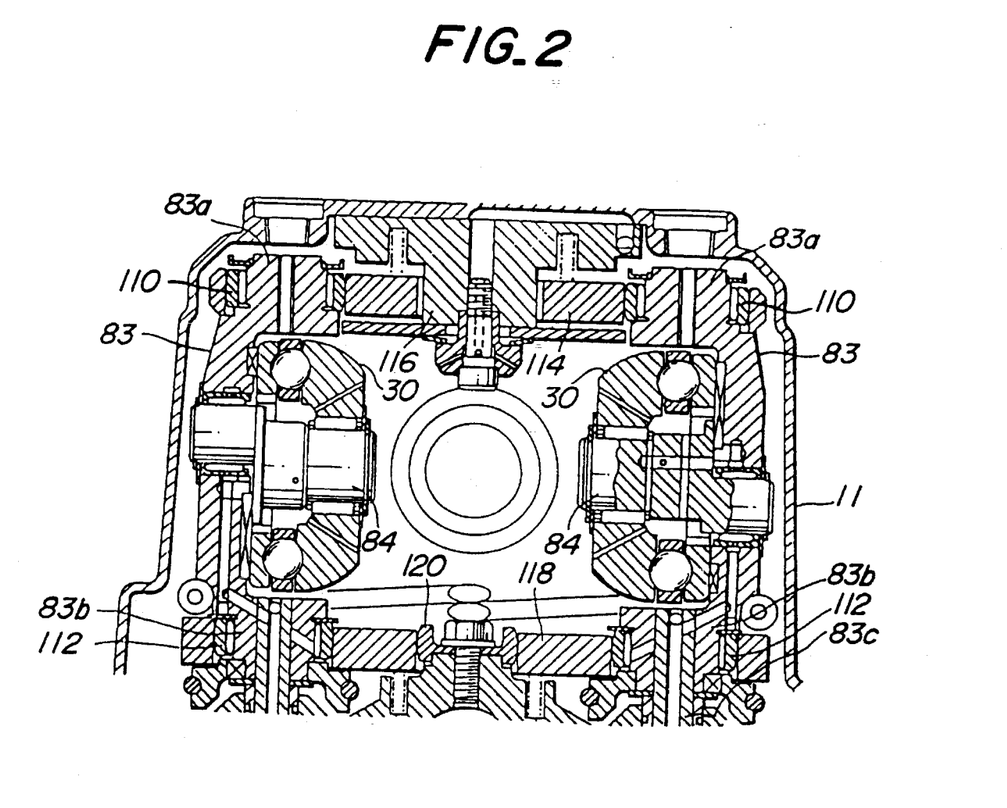
FIG. 2 is a partial sectional view of a first speed ratio control mechanism.

FIG. 2 is a sectional view showing part of the first speed ratio control mechanism 22. It should be noted in this connection that, although the representation has been omitted for the sake of simplicity, the second speed ratio control mechanism 24 has a basic constitution which is essentially same as that of the first speed ratio control mechanism 22 shown in FIG. 2.

The first speed ratio control mechanism 22 includes roller support members 83 in the form of trunnions which are supported at upper and lower shaft portions 83*a* and 83*b* by spherical bearings 110 and 112. These bearings 110 and 112 permit the roller support members 83 to undergo rotation and/or axial movement. The above-mentioned friction roller 30 is rotatably supported by the roller support member 83 through an eccentric shaft 84. The spherical bearing 110 is supported by a link 114 which is supported by a link post 116 which, in turn, is secured to the casing 11. Similarly, the spherical bearing 112 is supported by a link 118 which is supported by a link post 120 which, in turn, is secured to the casing 11. Each roller support member 83 has an extension 83*c* which is provided coaxially with the shaft portion 83*b*. The extension 83*c* is rotatable jointly with the shaft portion 83*b*.

Figure 3:
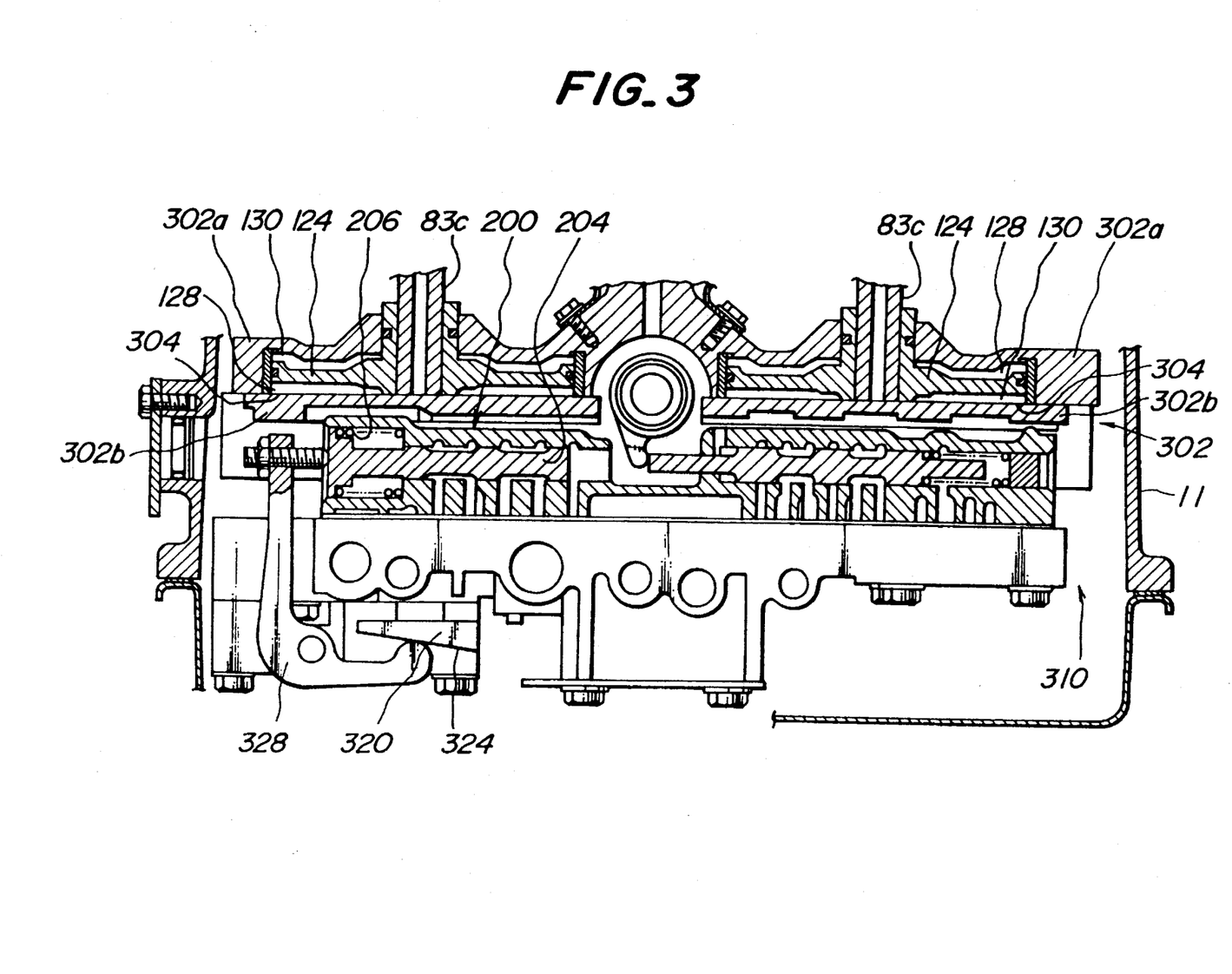
FIG. 3 is a sectional view showing the arrangement in the vicinity of a reverse drive speed ratio instruction valve.

The structure of the first speed ratio control mechanism 22 in its region which includes the lower part of the extension 83*c* shown in FIG. 2 will be further explained below with reference to FIGS. 3 and 4. FIG. 3 shows the arrangement in the vicinity of a reverse drive speed ratio instruction valve 200 for the reverse drive mode, and FIG. 4 shows the arrangement in the vicinity of a forward drive speed ratio control valve 202 for the forward drive mode.

As shown in FIG. 3, each extension 83*c* is provided on its outer periphery with a piston 124. The piston 124 is received within a piston bore 304 which is formed in a main cylinder body 302*a* secured to the casing 11. A subsidiary cylinder member 302*b* is secured to the lower surface of the main cylinder member 302*a*, and a consolidated cylinder body 302 is constituted by the main cylinder member 302*a* and the subsidiary cylinder member 302*b*. Pressure chambers 128 and 130 are formed on the opposite sides of the piston 124, so that the piston 124 can be axially moved by a hydraulic pressure acting thereon. It should be noted in this connection that the pressure chambers 128 and 130 are arranged upside-down with respect to the right side and the left side in FIG. 3. A hydraulic cylinder unit is constituted by the piston 124 and the consolidated cylinder body 302 comprised of the piston bore 304 in the main cylinder body 302*a*.

Figure 4:
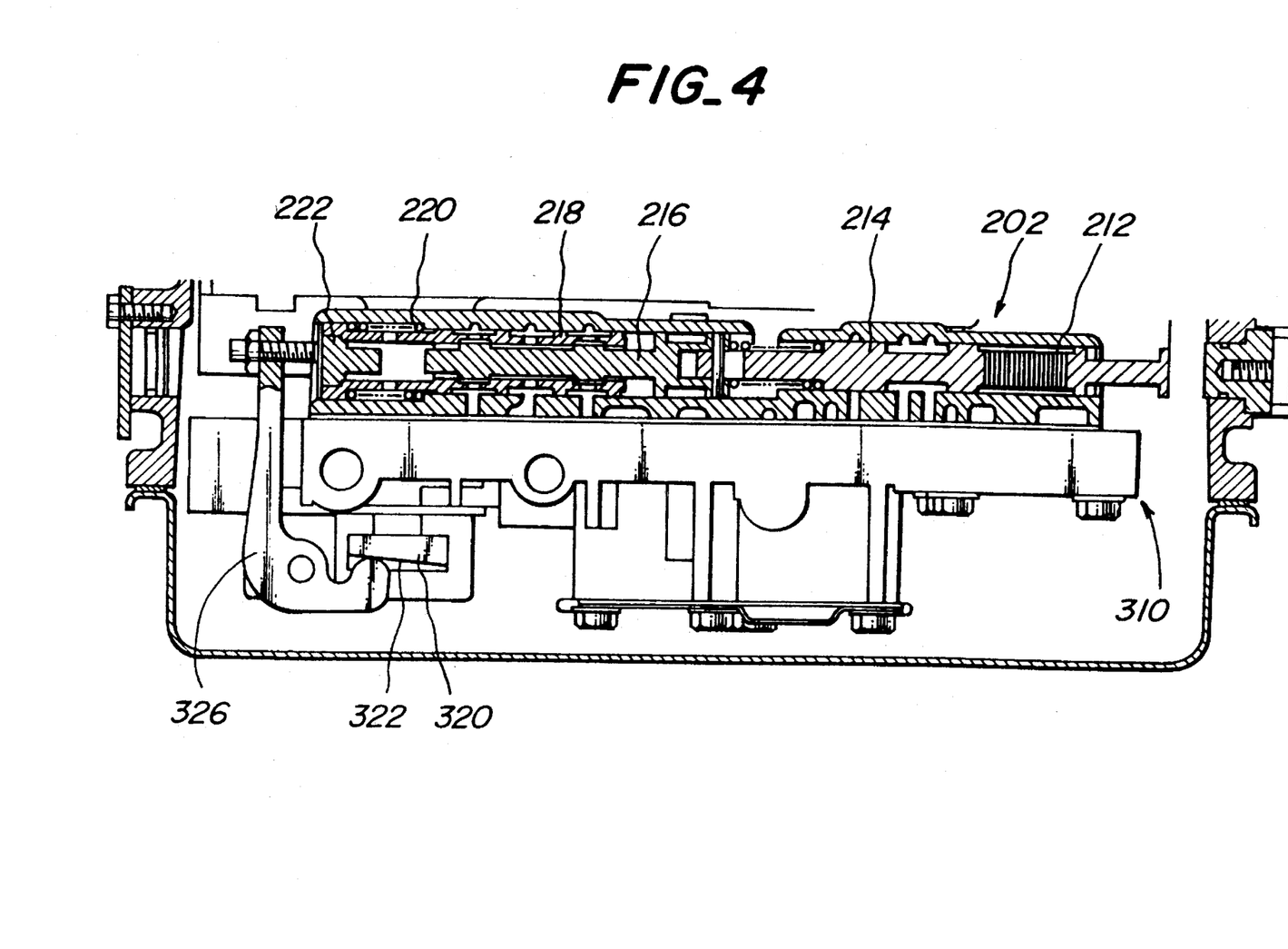
FIG. 4 is a sectional view showing the arrangement in the vicinity of a forward drive speed ratio control valve.
Figure 5:
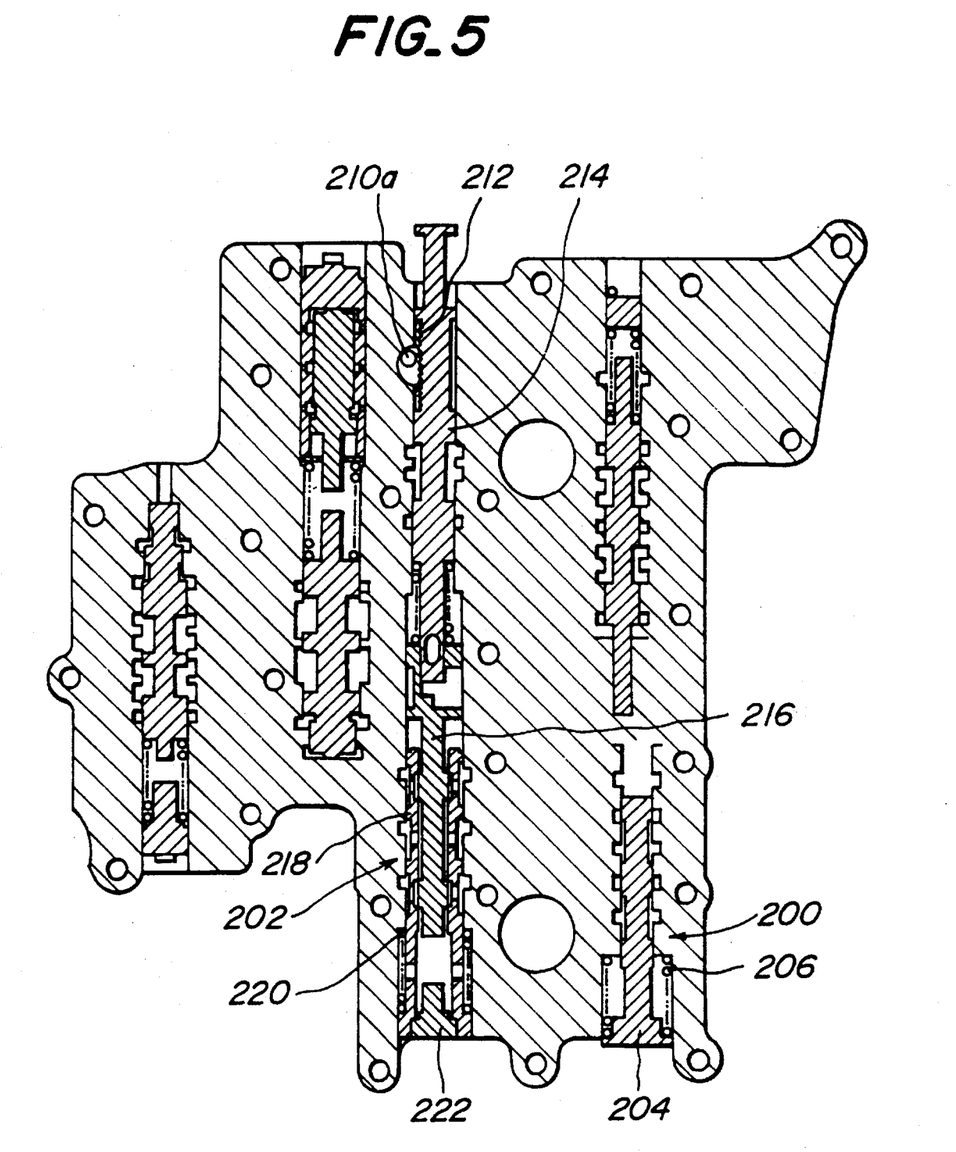
FIG. 5 is a sectional view showing the spatial relationship between the rearward drive speed ratio instruction valve and the forward drive speed ratio control valve.

A control valve body 310 is provided under the above-mentioned hydraulic cylinder unit, and is associated with the reverse drive speed ratio instruction valve 200 for the reverse drive mode shown in FIG. 3 and the forward drive speed ratio control valve 202 for the forward drive mode shown in FIG. 4. The forward drive speed ratio control valve 202 and the reverse drive speed ratio instruction valve 200 are arranged adjacent to each other with a predetermined space therebetween, as shown in FIG. 5.

The reverse drive speed ratio instruction valve 200 for the reverse drive mode is a valve for maintaining the speed ratio control mechanisms at a constant speed ratio state in the reverse drive mode, and includes a valve spool 204 and a spring 206 for urging the valve spool 204 toward left in FIG. 3.

As further shown in FIG. 4, the forward drive speed ratio control valve 202 for the forward drive mode includes a step motor 210 (FIG. 6), which is operated in accordance with an instructed speed ratio. The forward drive speed ratio control valve 202 further includes a valve spool 214 which is provided with a rack 212. The rack 212 is meshed with a pinion 210*a* (FIG. 5) which is driven by the step motor 210. Thus, when the step motor 210 drives the pinion 210*a*, the rack 212 is moved in the axial direction. Another valve spool 216 is provided, having one end which is connected to the valve spool 214 through an yield mechanism which may comprise a pin and an axially extending elongate hole. Thus, by operating the step motor 210, the valve spool 216 can be axially moved together with the spool 214. An outer sleeve 218 is provided on the outer periphery of the valve spool 216, and is urged by a spring 220 toward left in FIG. 4. A retainer 222 is fitted into the outer end portion of the sleeve 218.

The general arrangement and functions of the above-mentioned continuously variable transmission according to the present invention are basically same as those described in JP-A-4-78,365 and JP-A-4-78,366 which has been discussed hereinbefore. Accordingly, the disclosure of these patent documents are hereby incorporated by reference.

Figure 6:
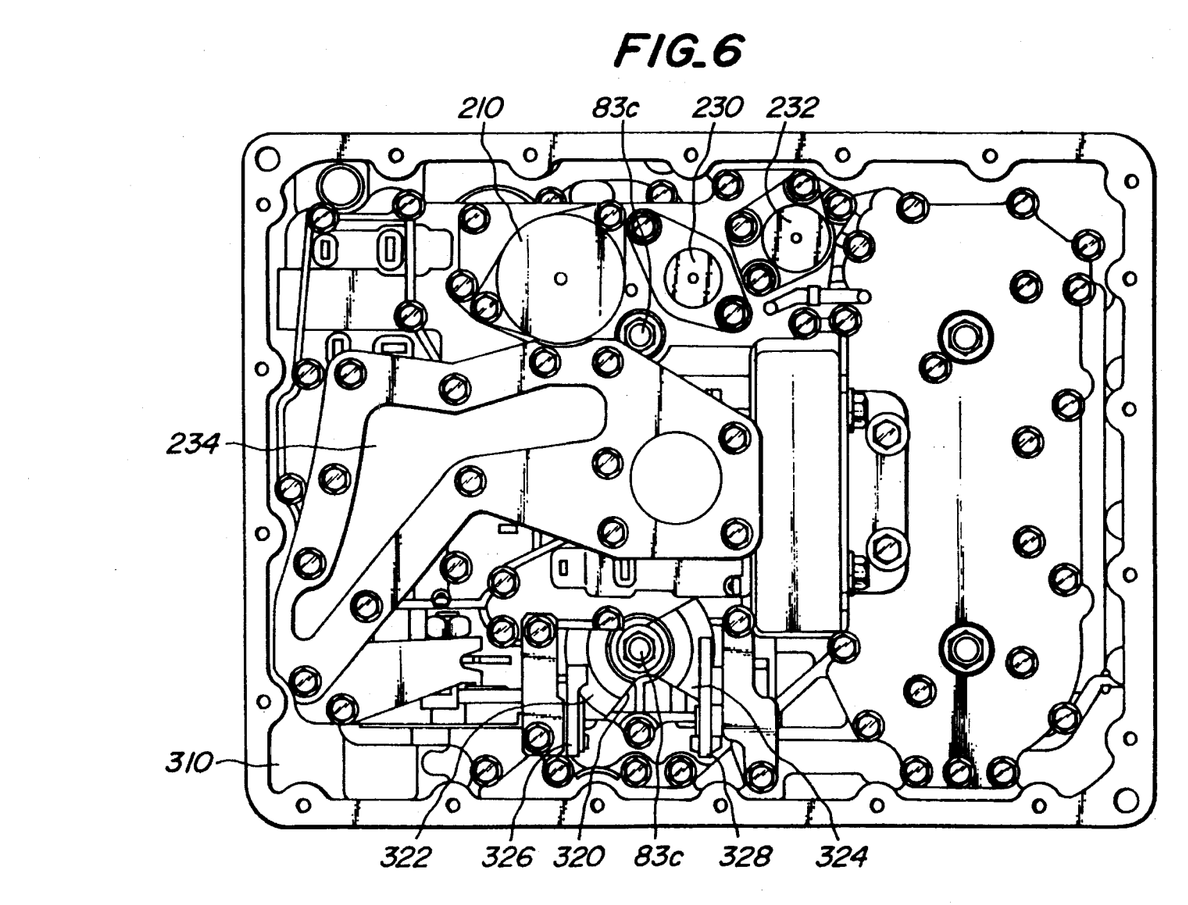
FIG. 6 is a plan view showing the control valve body as seen from the oil pan side.

According to the present invention, the extension 83*c* of one of the roller support members 83 has a lower end provided with a precession cam 320 which can be rotated jointly with the roller support member 83. As shown in FIG. 6, the precession cam 320 is formed with two cam surfaces 322 and 324 which are inclined along the periphery of the precession cam 320 and spaced from each other by a predetermined angle. The cam surfaces 322 and 324 of the precession cam 320 are contacted by links 326 and 328, respectively. A feedback mechanism is constituted by the precession cam 320 and the links 326 and 328.

When the precession cam 320 is rotated, the links 236 and 328 undergo swinging movement respectively. On this occasion, the forward end of the link 328 is capable of urging the valve spool 204 of the reverse drive speed ratio instruction valve 200 for the reverse drive mode as shown in FIG. 3, while the forward end of the link 326 is capable of urging the retainer 222 of the forward drive speed ratio control valve 202 for the forward drive mode as shown in FIG. 4. The feedback of the speed ratio to the reverse drive speed ratio instruction valve 200 and the forward drive speed ratio control valve 202 can be performed from the same direction, because the two links are associated with the same precession cam 320.

As for the arrangement of each of the components to be attached to the control valve body 310, as shown in FIG. 6, the precession cam 320 is attached to the extension 83*c* of the roller support member 83 illustrated on the lower side of FIG. 6, and the links 326 and 328 are urged into contact with the respective cam surfaces 322 and 324 of the precession cam 320, respectively. Furthermore, with reference to the extension 83*c* of the roller support member 83 illustrated on the upper side of FIG. 6, the step motor 210 is arranged on the upper left side, and a lock-up solenoid valve 230 and a line pressure solenoid valve 232 both included in the hydraulic circuit of the transmission are arranged on the upper right side. The lock-up solenoid valve 320 serves to control the engagement and disengagement of a lock-up clutch of the transmission, not shown. The line pressure solenoid valve 232 serves to control the line pressure. A strainer 234 also included in the hydraulic circuit is arranged between the two extensions 83*c*.

It will be appreciated that the present invention provides a continuously variable transmission with a novel speed ratio control apparatus, wherein a single precession cam serves to perform the feedback of the speed ratio to the forward drive speed ratio control valve for the forward drive mode and the reverse drive speed ratio instruction valve for the reverse drive mode, thereby to reduce the number of components and the cost of the apparatus.

Since the precession cam can be provided at one roller support member only, it is possible to arrange relatively large components of the transmission, such as step motor and solenoids, at respective locations around the other roller support member which is free of the precession cam. Such an arrangement serves to realize an improved speed ratio control apparatus which is compact and light in weight. Moreover, it becomes possible to attach the step motor, solenoids or the like from the oil pan side of the control valve body, thereby to facilitate the assembly and maintenance of the relevant components.

I claim:

1. A friction roller type continuously variable transmission, comprising:

an input disk and an output disk both having a common axis and contact surfaces which are opposed to each other to define a toroidal groove therebetween;

a plurality of friction rollers arranged in said toroidal groove and maintained in frictional contact with said contact surfaces of the input and output disks;

a plurality of roller support members for rotatably supporting the friction rollers through eccentric shafts, respectively, said roller support members each having a shaft portion with an axis which is perpendicular to said common axis of the input and output disks, said roller support members being rotatable about the axis of the shaft portions and axially movable along the shaft portions;

hydraulic cylinder units for driving the roller support members in the axial directions of said shaft portions;

a forward drive speed ratio control valve for controlling a hydraulic pressure to be supplied to the hydraulic cylinder units during a forward drive mode of the transmission;

a reverse drive speed ratio instruction valve for controlling the hydraulic pressures to be supplied to the hydraulic cylinder units during a reverse drive mode of the transmission; and a feed back mechanism for performing a speed ratio feedback by transmitting an angular displacement of the roller support member to the forward drive speed ratio control valve and the reverse drive speed ratio instruction valve so that a speed ratio between the input disk and the output disk assumes a target value;

said feedback mechanism comprising a precession cam provided for one of the roller support members so as to be rotatable jointly therewith, said precession cam having two cam surfaces which are inclined along the rotating direction of the precession cam;

said feedback mechanism further comprising two links adapted to undergo swing movement in accordance with the rotation of the precession cam and provided with first ends and second ends, respectively, said first ends of the two links being maintained in contact with the respective cam surfaces of the precession cam, said second end of one of said links being capable of performing a feedback of the speed ratio to said forward drive speed ratio control valve, and said second end of the other of said links being capable of performing a feedback of the speed ratio to the reverse drive speed ratio instruction valve, wherein said feedback mechanism further comprises a step motor which is operated in accordance with an instructed speed ratio to actuate said speed ratio control valve for the forward driving mode, said step motor being arranged adjacent to the other of the roller support members which is free from said precession cam.

2. A friction roller type continuously variable transmission, comprising:

an input disk and an output disk both having a common axis and contact surfaces which are opposed to each other to define a toroidal groove therebetween;

a plurality of friction rollers arranged in said toroidal groove and maintained in frictional contact with said contact surfaces of the input and output disks;

a plurality of roller support members for rotatably supporting the friction rollers through eccentric shafts, respectively, said roller support members each having a shaft portion with an axis which is perpendicular to said common axis of the input and output disks, said roller support members being rotatable about the axis of the shaft portions and axially movable along the shaft portions;

hydraulic cylinder units for driving the roller support members in the axial directions of said shaft portions;

a forward drive speed ratio control valve for controlling a hydraulic pressure to be supplied to the hydraulic cylinder units during a forward drive mode of the transmission;

a reverse drive speed ratio instruction valve for controlling the hydraulic pressures to be supplied to the hydraulic cylinder units during a reverse drive mode of the transmission;

a feed back mechanism for performing a speed ratio feedback by transmitting an angular displacement of the roller support member to the forward drive speed ratio control valve and the reverse drive speed ratio instruction valve so that a speed ratio between the input disk and the output disk assumes a target value, said feedback mechanism comprising a precession cam provided for one of the roller support members so as to be rotatable jointly therewith, said precession cam having two cam surfaces which are inclined along the rotating direction of the precession cam; and at least one solenoid valve which is included in a hydraulic circuit of the transmission, wherein said solenoid valve is arranged adjacent to the other of the roller support members which is free from said precession cam, said feedback mechanism further comprising two links adapted to undergo swing movement in accordance with the rotation of the precession cam and provided with first ends and second ends, respectively, said first ends of the two links being maintained in contact with the respective cam surfaces of the precession cam, said second end of one of said links being capable of performing a feedback of the speed ratio to said forward drive speed ratio control valve, and said second end of the other of said links being capable of performing a feedback of the speed ratio to the reverse drive speed ratio instruction valve.

* * * * *